Patented Nov. 20, 1934

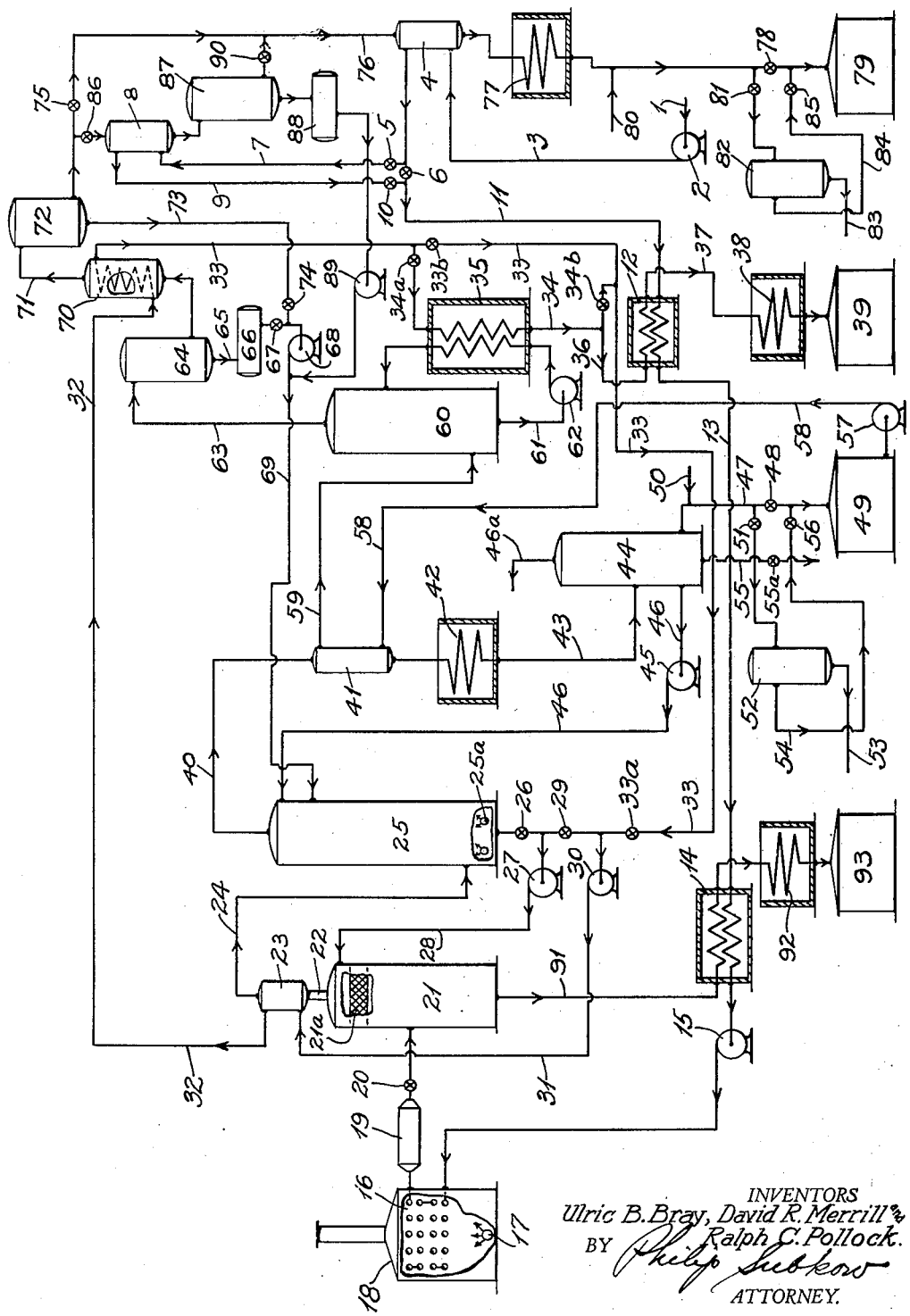

1,981,305

UNITED STATES PATENT OFFICE 1,981,305

PROCESS AND APPARATUS FOR THE CATALYTIC TREATMENT OF PETROLEUM

Ulric B. Bray, Los Angeles, and Ralph C. Pollock and David R. Merrill, Long Beach, Calif., assignors to Union Oil Company of California, Los Angeles, Calif., a corporation of California Application August 10, 1929, Serial No. 384,984

15 Claims. (Cl. 196—36)

This invention relates to a process and apparatus for catalytic treatment of petroleum.

Many processes for the treatment of petroleum by contact with catalysts have been suggested. Processes involving the oxidation, and hydrogenation and cracking and desulfurization of petroleum have been suggested in which the petroleum, usually but not necessarily in the form of a vapor, is passed in contact with catalytic material at elevated temperatures. In all of these processes we have discovered that the catalyst is poisoned after a time by certain bodies present in the petroleum vapors or formed by reaction between the catalyst and the petroleum vapors. It appears that these vapors on contact with these solid catalysts tend to deposit gum and polymerized bodies upon the catalyst. While this gum formation is known to cause most of the poisoning of the catalysts, other compounds may also produce this effect. We have found that the life of these catalysts may be greatly increased by treating these vapors before catalytic treatment with adsorbent materials, such as fuller's earth, charcoal, silica gels, iron oxide gels, alumina gels and adsorbent clays. Of these fuller's earth seems to be the best.

It is, therefore, an object of our invention to treat petroleum vapors, such as gasoline and kerosene vapors, particularly cracked gasoline vapors, by contacting them with fuller's earth or other adsorbent materials to separate from them those bodies which on contact with the catalyst poison the catalyst, and subsequently treat the vapors in the presence of a catalyst.

The invention is thus of broad applicability and independent of the particular catalytic reaction and the particular catalyst. It is a method of guarding a catalyst which is not dissolved in the oil to be treated, thus preventing the formation of gum-like materials which poison the catalyst. Such catalytic processes are well known and involve oxidation of petroleum by passing petroleum vapor over catalytic material together with oxygen to form alcohols and aldehydes; oxidation processes involving catalysts whereby air is blown through paraffine and other liquid oils to form alcohols, aldehydes and acids; and hydrogenation processes wherein oil is heated in the presence of various catalysts and in the presence of hydrogen to cause cracking and also hydrogenation. Such processes are well known in the art. In these cases a solid catalyst usually of the contact type is used, that is the catalyst is non-homogeneous or heterogeneous, and the oil either liquid or vapor is passed over the catalyst or in contact therewith. These solid contact catalysts are soon poisoned by gums and other bodies. This invention is directed to the removal of such bodies before the catalytic treatment. Examples of catalysts thus posioned are given in abundance in the prior art and are for example metals such as Ni, Co, Fe, Cu, oxides of the metals such as calcium oxide, nickel, cobalt and iron oxides, copper oxide, vanadium oxide, uranium oxide, manganese and silver oxides. In all these cases the catalyst is soon poisoned unless guarded as described herein.

While the process is of general applicability wherever a catalyst is used with vapors of this nature, it is particularly beneficial when used in connection with metallic sulfides whose action is to convert the mercaptan compounds in the vapors into compounds removable by sulfuric acid and $H_2S$. This invention does not relate to the discovery of the action of these metallic sulfides, but to the measure of treating the vapors before permitting them to be reacted on by the metallic sulfides.

It is well known that sulfur is present in petroleum oils, especially in light oils, such as gasoline and kerosene, and particularly cracked gasolines, in the form of what has come to be known as "sour" sulfur, i. e., sulfur compounds which react with alkaline reagents, such as sodium hydroxide and sodium plumbite. Sulfur is also present in the oil as corrosive sulfur. This is usually, but not necessarily, in the form of elementary sulfur, and perhaps in the form of other sulfur compounds. These corrosive sulfur compounds are identified by the familiar corrosion tests commonly used in the petroleum industry, as is well known to those skilled in the art. There are other sulfur compounds generally classed in the all-inclusive class of "total" sulfur. It can be said, with a certain degree of inclusiveness, that the sulfur present in light oils consists of elementary sulfur; sour sulfur in the form of hydrogen sulfide, mercaptans; sulfur in the form of organic sulfides and di-sulfides; and ring sulfur compounds in the form of thiophenes and analogous compounds. The conventional sulfur treatment for gasoline consists in the removal of the sour sulfur by alkaline reagents and the treatment with sulfuric acid to remove such compounds as are soluble or react with the sulfuric acid.

This has been accomplished by contacting the gasoline containing the sulfur compounds with a catalytic agent at an elevated temperature, which catalytic agent converts these sulfur compounds less soluble in sulfuric acid into a form more soluble in sulfuric acid. The particular type of catalyst which we find will function in this manner is inorganic sulfides.

It has been found that if gasoline, kerosene and other light oils containing sulfur in the form of organic sulfur compounds, particularly mercaptans, are contacted with a catalyst, such as an inorganic sulfide at an elevated temperature, these sulfides which are insoluble in sulfuric acid are converted into a form more soluble in sulfuric acid. While we do not wish to be limited by the theory, it is believed that this action can be explained on the assumption that the following reactions take place:

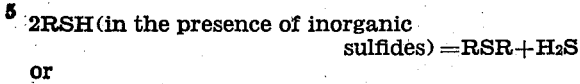

or

It will be observed that half of the sulfur is converted into the form of H₂S and the other into the form of a sulfide. In the above reactions, R or R' are different organic radicals. This is substantiated by observations that gasoline or kerosene containing these insoluble organic sulfur bodies, which are presumably of the nature of mercaptans, when treated in the manner above specified yield considerable portions of H₂S, which is soluble in sodium hydroxide. Thus it has been observed that cracked gasoline produced by the well known Cross method containing 0.34% of sulfur has its sulfur reduced to 0.25% by merely contacting the gasoline at an elevated temperature with catalysts and subsequently washing with sodium hydroxide. In the subsequent acid treatment with steam distillation to 90% overhead, this catalyst-treated gasoline required 5 lbs. per barrel net of H₂SO₄ (actual weight of H₂SO₄) as 93% acid, to reduce the sulfur to 0.15% sulfur, in contrast with 35 lbs. per barrel net (actual weight of H₂SO₄) of 93% acid and the same steam distillation in the same gasoline to produce a sulfur content of 0.15% sulfur without prior catalytic treatment. The inorganic sulfides are particularly effective as catalysts for this treatment. The sulfides which have been used and found effective are cadmium, zinc, copper, cobalt, lead, manganese, iron, tin and bismuth. In every case a positive reduction of sulfur content has been obtained with the liberation of hydrogen sulfide, with the transformation of the compounds difficultly soluble in sulfuric acid into those much more readily soluble. Of the above, cadmium, zinc, iron, manganese, and lead are the most reactive. In fact, it appears that any sulfide which is solid at the temperatures at which the reaction is carried out will effect the above reactions. As a method of definition and classification of the sulfides, the following may be used. Referring to page 43 of the "Introduction of Physical Chemistry" by James Walker, published by MacMillan and Company in 1919, if the dotted diagonal line is moved down one space in the table so as to put boron, silicon, arsenic and tellurium above it, the sulfides of all the elements which lie above this line will be found to be effective for this process. For the purpose of defining this invention, the sulfides of these metals will arbitrarily be called metalic sulfides, although this is certainly not scientific, in view of the facts that a number of the elements lying above this line are metalloid in character.

The temperature at which the reaction is best carried out ranges from 400 to 650° F. The lower temperatures are best applied to certain sulfides, such as copper sulfides, which give products of bad color at 550°, but acceptable color from 410 to 450°. Zinc sulfide gives products of good color up to 550°, but the color becomes progressively darker up to 650° F. Above 650° the life of the catalyst is shortened beyond an economical interest. The proper temperature will vary from each catalyst, and will be that at which the reaction is most rapid with least deterioration of color of the oil being treated and at which the catalyst has a practical reaction life, i. e., at which the catalyst does not deteriorate too quickly. Additionally, the temperature must not be carried too high or carbonization of the oil and destruction of the catalyst by deposition of tars and carbon therein results.

This invention will be better understood by reference to the drawing, which shows a schematic form for carrying out this invention and describes an apparatus for the most efficient utilization of the heat and is particularly applicable when the catalyst is to be operated at relatively high temperature, as is the case with the catalytic sulfide.

In the drawing the oil is drawn from storage through line 1 by pump 2, through line 3 and heat exchanger 4, then either through valve 5 or valve 6, as will be later described. When the passage is through valve 5, valve 6 is closed. The oil passes through line 7 and heat exchanger 8, through line 9 and valve 10. The oil then passes through line 11, heat exchanger 12, line 13 and heat exchanger 14 and is pumped by a high pressure pump through a cracking system as is here illustrated, for a high pressure so-called liquid-phase-cracking system of the Cross type. The oil is sent by high pressure pump 15, at high pressure in the neighborhood of 1200 lbs., through coils 16 and heated by burner 17 and furnace 18. It then passes through a reaction or digester coil 19. The pressure is reduced by valve 20 and the oil is introduced into evaporator 21. The vapors in the evaporator 21 pass through a mist extractor 21a, through a vapor line 22 and heat exchanger 23 and through line 24 into fractionating column 25. The condensate collected in 25 is reboiled by steam coils 25a and the condensate in the form of uncracked material is withdrawn through valve 26 by pump 27 and line 28, to be sprayed over the mist extractor 21a. By the proper regulation of valve 29, the material withdrawn through valve 26 is in part sent by pump 30 through line 31 through heat exchanger 23 and through line 32, through heat exchanger 70 and then through line 33, controlled by valves 33b and 33a to be returned by pump 30 to the heat exchanger 23. Part of this oil is led by valve 34a to be passed through heat exchanger 35 and to be by-passed by means of 34b, part going back by line 33 and part by line 36 through heat exchanger 12, line 37, cooler 38 to tank 39, which tank contains the cycle stock, which, together with fresh materials, makes up the charging stock to pump 2. The vapor leaving the fractionating column passes through line 40 to heat exchanger 41 and then to condenser 42 through line 43 to separating tank 44, the uncondensed gases exit through 46a and part of the condensate is returned as reflux by pump 45 through line 46 to the fractionating column. The condensed water resulting from the steam used in the fractionating column is withdrawn through line 55, controlled by valve 55a. Part of the condensate in 44 is withdrawn through line 47, controlled by valve 48 and directed to a cracked gasoline tank 49. It is usually preferred to introduce into the line running from the separating tank 44 a stream of sodium hydroxide introduced through line 50 in which case valve 48 is closed and valves 51 and 56 open and the mixed sodium hydroxide and gasoline is sent to separating tank 52. The sodium hydroxide settles out and is withdrawn through 53 and the treated gasoline is sent through line 54 into tank 49. The gasoline content in tank 49 is pumped by pump 57 through line 58 through heat exchanger 41 and through line 59 into evaporator 60. The gasoline in 60 is evaporated. The unvaporized material in 60 is evaporated by circulating through line 61 and pump 62 and heat exchanger 35 into evaporator 60. This exchange of heat causes a reboiling of the gasoline. The vapors are withdrawn through 63 into fuller's earth tower 64. The polymerized fractions are removed through 65 to tank 66 and by regulation of valve 67 are pumped by pump 68 through line 69 to be reintroduced into fractionating column 25. The vapors pass from fuller's earth tower 64 into heat exchanger 70 where they are heated by the circulating oil and then pass into catalytic tower 72 containing zinc sulfide. Such condensate as may be formed in this tower, in starting or otherwise, is withdrawn by line 73 by regulation of valve 74 and is pumped by pump 68 together with the polymerized product from 64 into fractionating column 25. The treated vapors leaving 72 are withdrawn either through line 76 by regulating of valve 75 to be passed direct to the condensing system or as is preferred, the vapors are given a second fuller's earth treatment by passing through valve 86, heat exchanger 8 into fuller's earth tower 87 and the polymerized product passes to tank 88 to be pumped by pump 89 to be sent together with the product in line 69 to the fractionating column. The vapors from 87 pass through 90 into 76 and then pass through heat exchanger 4, where they are sent through condenser 77 to tank 79, by proper regulation of valve 78. It is usually preferred to treat the condensate immediately after it is formed by sodium hydroxide and sodium hydroxide is introduced through line 80 and by closing valve 78 and by opening valves 81 and 85 the mixed gasoline and sodium hydroxide passes through separator 82. The spent sodium hydroxide being removed through 83 and the gasoline passes through line 84, to the cleaned cracked gasoline tank 79. The cracked residuum which is contained in evaporator 21 is withdrawn through line 91 through heat exchanger 14, passes through cooler 92 into tank 93.

The following is a specific example of the operation on one type of cracking stock and the temperatures are merely illustrative of the process and are not intended to be taken as a limitation on the invention.

It will be observed that the process consists of a cracking coil 16, a digester 19, an evaporator 21 and a fractionating column 25. The oil to be treated may be a California gas-oil of approximately 30–32° A. P. I. gravity. The cracked gasoline vapors passing from fractionating column 25 through the line 40 are condensed by heat exchange with the condensate produced therefrom. The condensed gasoline from condenser 42 after leaving separator 44 is treated with sodium hydroxide. The object of this treatment is to prepare it for the subsequent catalytic treatment. The condensed gasoline is passed in heat exchange with the hot vapors from fractionating column 25 and revaporized in the evaporator 60. The heat obtained for the revaporization of the gasoline is from the hot condensate or cycle stock produced in 25. This hot cycle stock is further heated by heat exchange with the vapors in 23. The cycle stock coming from a cracking system and being also heated by the cracked vapors, has ample heat to control the temperature of the vapors in the treating tower. For example, the cycle stock passing through 32 may be at 600–650° F.

Part of the heat is taken up in 70, as will be later described, and part of the heat is taken up by the circulating gasoline circulated by pump 62. The revaporized gasoline from evaporator 60 passes to a fuller's earth treatment in 64, the vapors entering at about 350–425° F. The polymerized products or condensates formed in 64 are refractionated in column 25, and the fuller's-earth-treated gasoline is then passed to the catalytic treatment in tower 72. Since the treatment with the catalyst is usually at a higher temperature than that required for fuller's earh treatment, the vapors are raised in temperature to about 500–550° F. by heat exchange with the circulating hot cycle stock. The residual heat in the cycle stock, after it has given up its heat in 70 and 35, is taken up by the feed. Such liquid products or condensates as are formed in 72 are returned through 73 by pump 68 to the fractionating column 25. Following the reaction in the catalytic chamber, especially when metallic sulfides are used, the vapors usually require a further treatment with fuller's earth. Since the fuller's earth treatment is at a lower temperature than the catalytic treatment, the vapors are cooled in heat exchanger 8 by the incoming feed to about 350–425° F. and are then contacted with fuller's earth in tower 87. The polymerized products or condensates are circulated by pump 89 and sent to fractionating column 25. The treated gasoline is then passed through line 76. If the gasoline treated in catalytic tower 72 requires no further treatment, the fuller's earth tower 87 may be by-passed by closing valves 86 and 90 and the treated vapors may be passed through valve 75 by line 76. The vapors passing through 76 are passed through heat exchanger 4, where they give up their heat to the feed and are condensed by condenser 77. The condensed gasoline is treated with sodium hydroxide passed through line 80 and, valve 78 being closed, is sent to the separator 82 where the sodium hydroxide is separated and the treated gasoline passes into tower 79. It is subsequently to be treated with sulfuric acid and with doctor solution as may be required, as will be understood by those skilled in the art.

While this specific example illustrates the operation using ZnS and fuller's earth, it is evident that the catalyst and the adsorbent material, and also the temperatures may be varied, as described in this specification, without departing from the spirit of this invention.

The amount of condensate and polymers formed in 64 and 87 and collected in 66 and 88 may be made to vary from 2 to 15 percent. (preferably 15 percent.) of the gasoline throughout by controlling the temperature of the operation, and this must be determined for each stock to get the proper removal of poisoning agents. However 10 percent. is an average figure. It is frequently desirable to operate at the lower temperatures and condense some of the vapors to flush the adsorbent material during the process.

The above is illustrative of the invention and of the best method of employing the same. Many variations thereof will appear to those skilled in the art without departing from the invention which we claim is:

1. An apparatus for cracking oil which comprises a cracking means, a vaporizer connected therewith, a fractionating column, means for passing vapors from said vaporizer to said fractionating column, a condenser connected to said fractionating column, a second vaporizing column, means for introducing said condensate from said condenser to said second vaporizer, means for passing vapors from said vaporizing tower through a bed of adsorbent material, means for heating the vapors passing from said bed, means for passing the thus heated vapors through a bed of catalytic material, means for condensing said vapors, means for circulating condensate produced in said fractionating tower in heat exchange with vapors withdrawn from the first mentioned vaporizing tower and in heat exchange with the condensate produced in said first mentioned condenser and with the vapors issuing from said first mentioned bed of adsorbent material.

2. In processes of treating cracked petroleum distillate containing gum forming constituents wherein the distillate is vaporized and contacted with a metallic sulphide catalyst to convert sulphur compounds therein, the method of preventing poisoning of, and loss of efficiency in said catalyst which is poisoned by the presence of gum forming constituents in said distillate which comprises contacting the vaporized cracked distillate with a solid adsorbent material to polymerize said gum forming constituents to gums and to adsorb said gums so that the gum forming constituents are removed from the vaporized distillate before said distillate is contacted with the catalyst, and then contacting the vaporized distillate with a metallic sulphide catalyst to convert sulphur compounds in the distillate to forms readily soluble in sulphuric acid.

3. The process as in claim 2 wherein the distillate is a cracked gasoline.

4. The process as in claim 2 wherein the catalyst is zinc sulphide.

5. In processes of treating petroleum distillate containing gum forming constituents wherein said distillate is vaporized and contacted with a metallic sulphide catalyst to convert sulphur compounds therein, the method of preventing poisoning of, and loss of efficiency of said catalysts which are poisoned by the presence of gum forming constituents in said distillate which comprises contacting the vaporized distillate with fuller's earth to polymerize said gum forming constituents to gums and to adsorb said gums so that the gum forming constituents are removed from the vaporized distillate before the distillate is contacted with the catalyst, and then contacting the vaporized distillate with a metallic sulphide catalyst to convert sulphur compounds in the distillate to forms readily soluble in sulphuric acid.

6. The process as in claim 5 wherein the distillate is a cracked petroleum distillate.

7. The process as in claim 5 wherein the distillate is a cracked gasoline.

8. The process as in claim 5 wherein the catalyst is zinc sulphide.

9. In processes of treating cracked petroleum distillate containing gum forming constituents wherein said distillate is vaporized and contacted with a metallic sulphide catalyst to convert sulphur compounds therein, the method of preventing poisoning of, and loss of efficiency of said catalysts which are poisoned by the presence of gum forming constituents in said distillate which comprises contacting the vaporized distillate with fuller's earth to polymerize said gum forming constituents to gums and to adsorb said gums, so that the gum forming constituents are removed from the vaporized distillate before the distillate is contacted with the catalyst, then contacting the vaporized cracked distillate with a metallic sulphide catalyst to convert sulphur compounds in the distillate to forms readily soluble in sulphuric acid, then commingling said distillate with sulphuric acid and removing the acid reaction products from the oil after said contact with sulphuric acid.

10. The process as in claim 9 wherein the catalyst is cadmium sulphide.

11. In processes of treating petroleum distillate containing gum forming constituents wherein said distillate is vaporized and contacted with a metallic sulphide catalyst to convert sulphur compounds therein, the method of preventing poisoning of, and loss of efficiency of said catalysts which are poisoned by the presence of gum forming constituents in said distillate which comprises contacting the vaporized distillate with fuller's earth to polymerize said gum forming constituents to gums and to adsorb said gums so that the gum forming constituents are removed from the vaporized distillate before the distillate is contacted with the catalyst, and then contacting the vaporized distillate with a metallic sulphide catalyst to convert sulphur compounds in the distillate to forms readily soluble in sulphuric acid, said contact with said metallic sulphide being at a temperature higher than the temperature of contact with said fuller's earth.

12. A process of treating oil which comprises cracking said oil, generating cracked vapors therefrom containing gum-forming constituents which poison and reduce the efficiency of metallic sulphide catalysts by forming gum when contacted with said catalysts, contacting said vapors, after cracking, with a solid adsorbent material to polymerize said gum forming constituents to gums and to adsorb said gums so that the gum forming constituents are removed from the cracked vapors before said vapors are contacted with the catalyst, and then contacting said cracked vapors with a metallic sulphide catalyst to convert sulphur compounds in the distillate to forms readily soluble in sulphuric acid.

13. A process of treating petroleum distillate containing gum-forming constituents wherein said distillate is vaporized and subjected to treatment of the type of hydrogenation, cracking, oxidation or desulphurization in the presence of a catalyst, the method of preventing poisoning of and loss of efficiency of said catalyst which is poisoned by the presence of gum-forming constituents in said distillate which comprises preliminarily contacting the vaporized distillate with a solid adsorbent material to polymerize said gum-forming constituents to gums and to adsorb said gums so that the gum-forming constituents are removed from the vaporized distillate before said distillate is contacted with the catalyst, and then contacting the vaporized purified distillate with said first mentioned catalyst, the catalyst material being different from said adsorbent material.

14. A process as in claim 13 wherein the distillate is a cracked gasoline.

15. A process as in claim 13 wherein the solid adsorbent material is fuller's earth.

ULRIC B. BRAY.
RALPH C. POLLOCK.
DAVID R. MERRILL.